April 1, 1952 H. E. FREEMAN 2,591,058
SCREEN AND LENS CALCULATOR
Filed March 19, 1951 2 SHEETS—SHEET 1
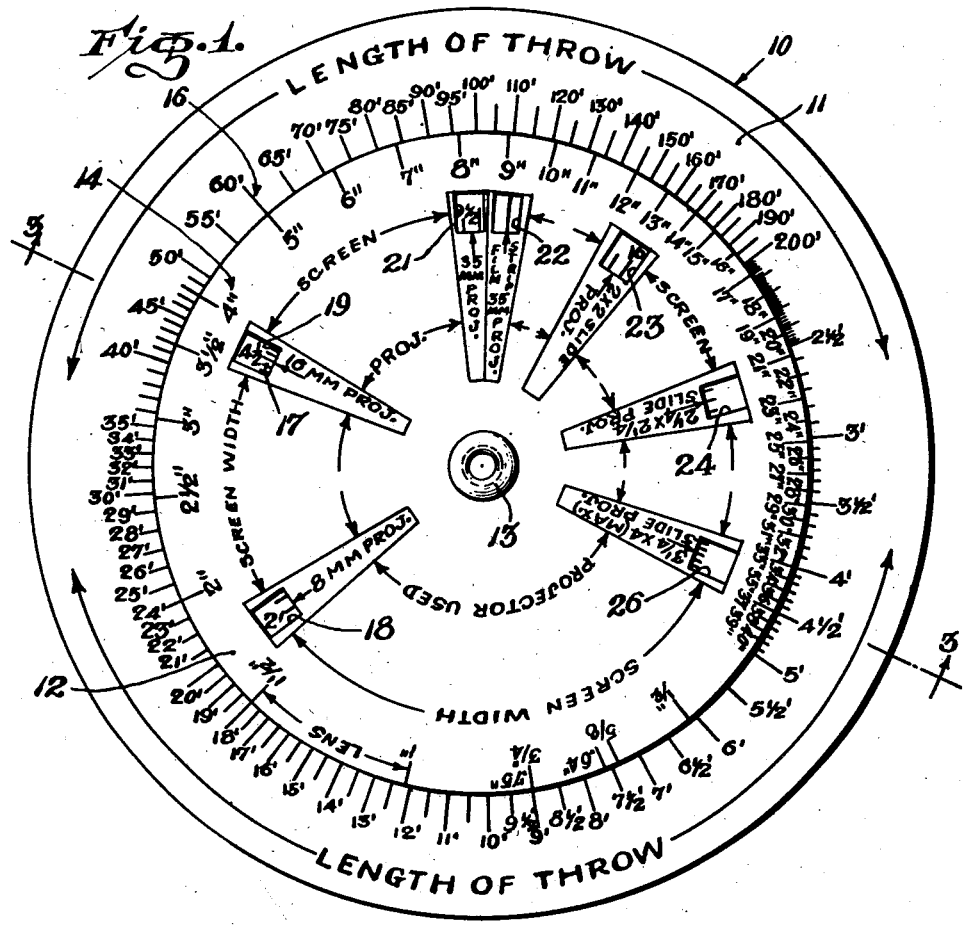
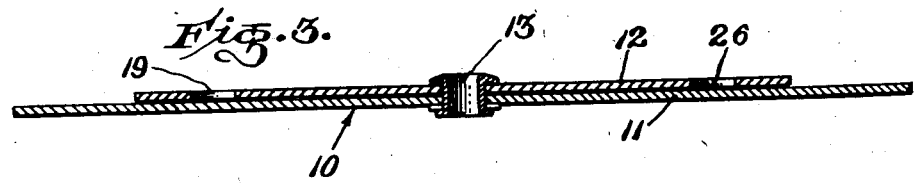
INVENTOR.
Howard E. Freeman
BY
Attorneys.

April 1, 1952  H. E. FREEMAN  2,591,058
SCREEN AND LENS CALCULATOR
Filed March 19, 1951.  2 SHEETS—SHEET 2
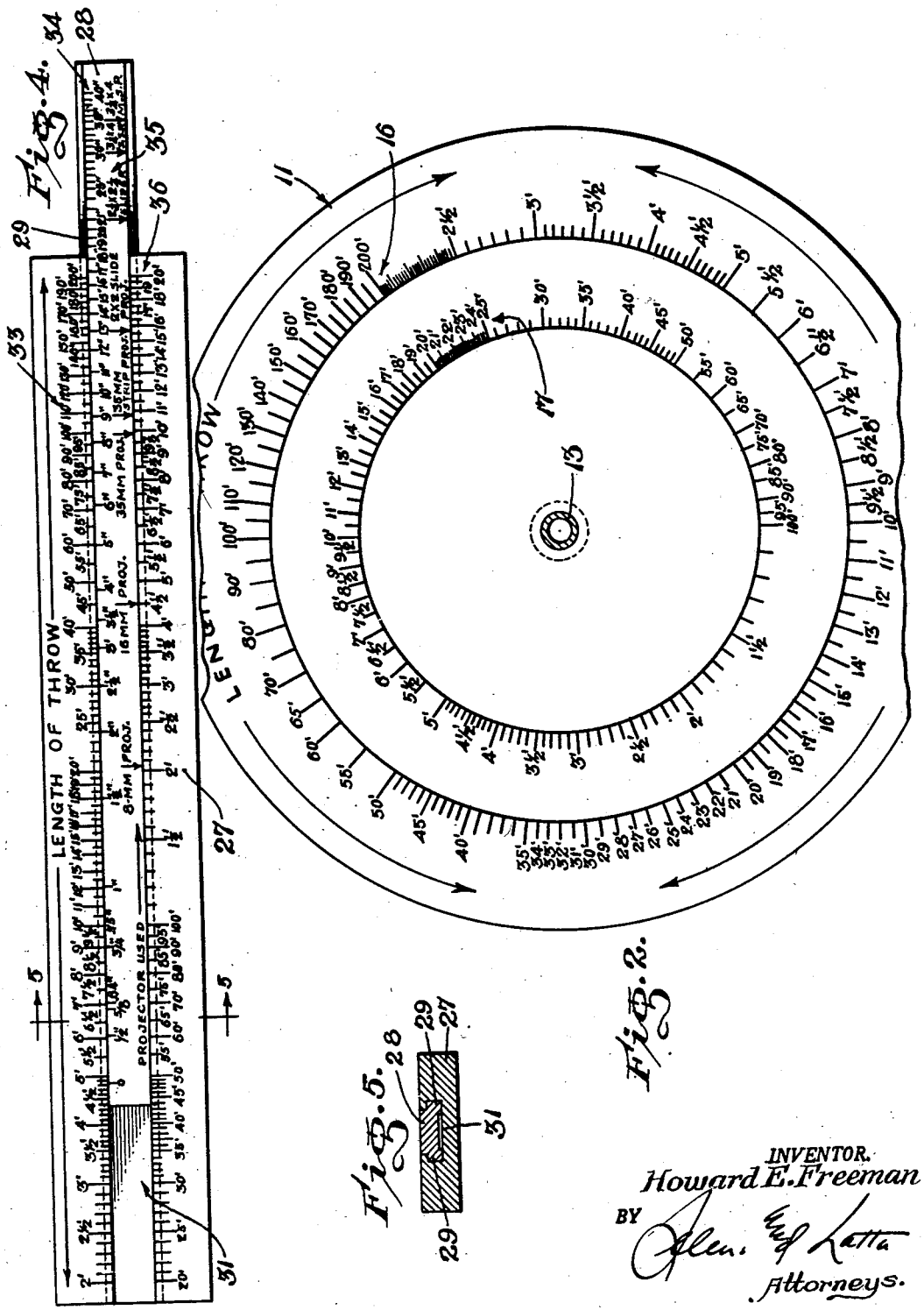
INVENTOR.
Howard E. Freeman
BY
Attorneys.

Patented Apr. 1, 1952

2,591,058

UNITED STATES PATENT OFFICE 2,591,058

SCREEN AND LENS CALCULATOR

Howard E. Freeman, Sherman Oaks, Calif.

Application March 19, 1951, Serial No. 216,384

1 Claim. (Cl. 235—84)

This invention relates to a calculator of the sliding rule or rotary disc type adaptable to ascertain a particular figure which is a simple function of a plurality of factors. More particularly the invention relates to a calculator from which may be determined the required size of a screen located a specified distance from a projector having a particular aperture size and a particular lens focal length.

The calculator may be utilized with either cinematic or still (i. e. slide) projectors. Briefly, the projector screen width is a function of three variables, viz., the projector aperture size, the lens focal length, and the distance between the projector and the screen. Standard projectors have an aperture height equal to ¾ of the aperture width. A standard screen is, therefore, designed with a height equal to about ¾ of its width. Thus, all dimensions of the screen may be determined by the use of the device disclosed in the present invention.

Graphs and tables now in general use for determining the size of a screen to be used under specified conditions are unsatisfactory in that far too compendious a volume of tables or graphs is necessary.

Each table or co-planar graph is necessarily limited in showing the screen size as a variable of only one of the three factors set out above, the other factors necessarily remaining constant. If each table or graph shows the screen size as a function between the screen and projector there must be one graph or table for each different aperture size and each different focal length, or the number of graphs required to encompass all possibilities encountered in the variation of each factor must equal the product of possible aperture sizes and lens focal lengths. The objection to such a large number of graphs or tables lies in the fact that their use and care is clumsy and difficult. This objection is largely overcome by use of a device constructed in accordance with the present invention.

A primary object of this invention is to provide a device which may simply and quickly calculate the size of a projection screen to be used with a projector having a particular aperture size, a particular focal length, and located at a specified distance from the screen.

A further object of this invention is to provide a device to simply and rapidly calculate the necessary distance which must separate a screen of specified size from a projector having a particular aperture and focal length.

A further object of this invention is to provide a device to calculate simply and rapidly any one of four factors, viz., screen size, focal length, distance between screen and projector or aperture size when the other three quantities are known.

These and other objects will appear as the invention is more fully hereinafter described in the following specification, illustrated in the accompanying drawings and finally pointed out in the appended claim.

Referring now to the drawings:

Figure 1 is a plan view of a complete rotary disc calculator constructed in accordance with the present invention;

Figure 2 is a plan view of the base of the rotary disc calculator with the movable disc removed for illustrative purposes;

Figure 3 is a cross-sectional view of the rotary disc calculator taken on line 3—3 of Figure 1;

Figure 4 is another preferred embodiment of the invention in which the parts are arranged for relative linear displacement; and Figure 5 is an end view of the embodiment illustrated in Figure 4.

Referring again to the drawings, and in particular to Figure 1, a rotary disc computer constructed in accordance with the present device is indicated generally by the reference character 10. This embodiment comprises a flat base 11, which may be circular or quadrangular in shape, and a flat disc 12, the base and the disc being rotatably connected by a pin or hub 13. Referring to Figure 2, base 11 is seen to have two circular scales inscribed on it concentric to axial pin 13. The outer scale, indicated by the reference character 16, is denominated by the term "length of throw," and represents, in increasing consecutive clockwise order, distances in feet between the projector and the projection screen. This scale has a range of one to two hundred feet and is a logarithmic scale as are the others utilized in the present invention. The inner scale, reference character 17, is denominated by the term "screen width," and its radial inscriptions and identifying numbers represent, in increasing consecutive clockwise order, sizes of screen width in feet and fractions thereof. This scale has a range of one to one hundred feet.

Rotary disc 12, Figure 1, has a circular scale 14 located at its peripheral edge. The radial inscriptions and the identifying numbers appearing on this scale, represent in increasing consecutive clockwise order focal lengths of projector lens in inches. This scale has a range of zero to forty inches. Windows, indicated by reference characters 18, 19, 21, 22, 23, 24 and 26, respectively, are constructed in disc 12 equidistantly from its center comprising the axis of pin 13. The radial distance spacing these windows from the center of disc 12 is equal to that of scale 17 from pin 13. These windows and their respective radial index arrows extending perpendicularly to the lower frames thereof represent projector aperture sizes in increasing consecutive clockwise order. Window 18 represents the aperture size of an 8 millimeter projector. Window 19 that of a 16 millimeter projector. Windows 21, 22, 23, 24 and 26 present, respectively, 35 millimeter cinematic projector, 35 millimeter film strip projector, 2" x 2" slide projector, 2¼" x 2¼" slide projectors, 3¼" x 4" slide projector aperture sizes.

With rotary disc 12 mounted by means of pin 13 on base 11 the radial inscriptions of peripheral scale 14 on disc 12 are adapted to be aligned selectively with the radial inscriptions of outer scale 16 on base 11. By rotating disc 12 the desired lens focal length inscription may be indexed to the desired projection distance inscription. Inner scale 17 of the base is visible only through the apertures or windows 18, 19, 21, etc. in the disc. Alternatively, a transparent disc may be provided with a circular scale inscribed thereon representing all conceivable aperture sizes within the range provided for, i. e., 8 millimeters to 3¼" x 4" may be utilized. In this construction any aperture size may be determined when the other elements of lens focal length, projection distance and screen width are fixed.

In Figure 4 a second preferred embodiment of the invention is illustrated. This embodiment comprises a flat rectangular elongated base member 27 having an inverted T-shaped channel 31 centrally cut in its upper surface along its longitudinal axis which seats an inverted T-shaped movable member 28 formed with laterally extending retaining flanges 29. Channel 31 encloses all but the upper surface of movable member 28, the laterally extending retaining flanges 29 of the latter resistingly restraining the movable member to longitudinal sliding.

Two logarithmic scales 34 and 35 are inscribed on opposite edges of the upper surface of movable member 28. The inscriptions and the identifying figures of scale 34 represent projector lens focal length in inches. This scale has a range extending from zero to forty inches. Scale 35 in the illustrated embodiment is provided with eight index positions representing, respectively, eight standard projector aperture sizes, viz., 8 millimeter, 16 millimeter, 35 millimeter sound cinematic, 35 millimeter strip film, 2" x 2" slide, 2¼" x 2¼" slide, 3¼" x 4" slide, and 3¼" x 4" M. S. P.

Two logarithmic scales 33 and 36 are inscribed on the top surface of elongated base member 27 at and along the opposing edges of channel 31. Scale 33 represents length of throw, or projector-to-screen distance, in feet. This scale has a range of two to 200 feet. Scale 36 represents width in feet and fractions thereof and is divided as shown, the larger screen sizes beginning at twenty feet appearing at the left end of the scale and increasing in consecutive order to the size of one hundred feet and then dropping to one foot and increasing in consecutive order to twenty feet at the right end of the scale.

When movable member 28 is properly inserted in slot 31 scale 33 abuts 34 and scale 35 abuts scale 36. In this position the inscriptions and identifying numbers of length of throw scale 33 are adapted to be aligned with the inscription and identifying numbers of lens focal length scale 34. The desired screen width is read on scale 36 under appropriate projector aperture index arrow of scale 35.

In this embodiment member 28 is moved longitudinally in member 27 until the inscription on scale 34 representing the focal length of the projector lens to be used is aligned with the inscription on scale 33 representing the desired projector to screen distance. The required screen width is then read from scale 36 under the aperture size index arrow of the projector being used.

The formula, width of screen (in feet) = $\dfrac{\text{size of aperture (in inches)} \times \text{projection distance (in feet)}}{\text{focal length of lens (in inches)}}$ describes the relationship of the factors concerned. The principle by which this formula is incorporated in both the rotatable disc calculator and the flat elongated rectangular calculator is the same.

In the operation of a device constructed in accordance with the rotary disc embodiment of the present invention the ratio of projection distance to lens focal length is obtained by rotating disc 12 on base 11 until the inscription representing the desired lens focal length on scale 14 appears aligned with the inscription representing the desired projection distance on scale 16. By referring to the aperture size of the particular machine being used, and its corresponding window in disc 11, the width of the screen from scale 17 is viewed through the window and selectively indicated by the radial index arrow thereof. For example, let it be assumed that the operator has a 16 millimeter projector equipped with a lens having a 5 inch focal length. Further assume the operator desires to utilize the machine in a room that has 60 feet of available distance between the desired positions of the projector and screen, respectively. Disc 12 is rotated until the inscription of sixty feet (60') appearing on the length of throw or projection distance scale 16 is aligned with the inscription of 5 inches appearing on lens focal length scale 14. Referring to the window 19, provided for 16 millimeter projectors and the radial index arrow inscribed on disc 12 perpendicular to the lower frame of said window, it is noted that the quantity 4½ feet of scale 17 of base 11 is visible through the window. It is the desirable screen width under the circumstances assumed.

Noting that 16 millimeters is equivalent to .380 inches and supplying the factors of aperture width, focal length, and projection distance in the equation set out above, the width of the screen is determined to be $$w = \dfrac{.380 \text{ inches} \times 60 \text{ feet} \times 12 \text{ inches}}{5 \text{ inches} \times 1 \text{ foot}} = 54.7 \text{ inches}$$

or approximately 4½ feet, thereby checking the reading of the rule.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

In a calculator of the class in which relatively movable members inscribed with coacting scales are selectively adjusted to indicate screen width from known values of projector aperture size, lens focal length, and projector-to-screen distance, a flat base having a pivot point, and inscribed with a first series of characters arranged in a continuous circular scale representing different projector-to-screen distances in clockwise consecutive order of increasing magnitude, said base being inscribed with a second series of characters arranged in a second continuous circular scale within said first series of characters representing different projection screen widths in clockwise consecutive order of increasing magnitude, said first series of characters and said second series of characters being concentric to said pivot point, a rotatable flat disc mounted on said pivot point, the periphery of said disc being inscribed with a third series of characters arranged in a continuous circular scale concentric to said point and representing different sizes of projection lens focal length in clockwise consecutive order of increasing magnitude, said disc having its peripheral edge contiguous to said first series of characters and lying over and obstructing said second series of characters, said disc being formed with a plurality of windows each representing different projector aperture sizes and each adapted to disclose selectively certain of said second series of characters, said disc being adapted to be rotated about said pivot point until any desired character of said first series on said base and its respective scalar mark is aligned with any desired character of said third series on said disc and its respective scalar mark, each of said windows disclosing from the second series of characters on said base the particular screen width necessary for the particular projector-to-screen distance, the particular lens focal length, with the particular projector aperture size of that window.

HOWARD E. FREEMAN.

REFERENCES CITED

The following references are of record in the file of this patent:

UNITED STATES PATENTS

| Number | Name | Date |
| --- | --- | --- |
| 677,817 | Thacher | July 2, 1901 |
| 1,429,264 | Wright | Sept. 19, 1922 |

FOREIGN PATENTS

| Number | Country | Date |
| --- | --- | --- |
| 567,915 | Great Britain | Mar. 8, 1945 |

OTHER REFERENCES

"Industrial Management," January 1918, published by "The Engineering Magazine Co.," No. 6, East 39th St., New York, N. Y., (pages 42, 43, and 44).

"Special Slide Rules," by J. N. Arnold, bulletin No. 32, published by Purdue University of La Fayette, Indiana, September 1933 (pp. 18–29).